US012526628B2

(12) United States Patent
Zhao

(10) Patent No.: US 12,526,628 B2
(45) Date of Patent: Jan. 13, 2026

(54) ROUTER, NETWORK CONNECTION METHOD AND MOBILE TERMINAL

(71) Applicant: HuiZhou TCL Mobile Communication Co., Ltd., Guangdong (CN)

(72) Inventor: Yunhua Zhao, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 352 days.

(21) Appl. No.: 17/602,818

(22) PCT Filed: Dec. 13, 2019

(86) PCT No.: PCT/CN2019/125051
§ 371 (c)(1),
(2) Date: Oct. 11, 2021

(87) PCT Pub. No.: WO2020/220694
PCT Pub. Date: Nov. 5, 2020

(65) Prior Publication Data
US 2022/0159462 A1    May 19, 2022

(30) Foreign Application Priority Data

Apr. 29, 2019 (CN) .......................... 201910355810.1

(51) Int. Cl.
*H04W 12/069* (2021.01)
*H04L 9/32* (2006.01)
(Continued)

(52) U.S. Cl.
CPC ......... *H04W 12/069* (2021.01); *H04L 9/3226* (2013.01); *H04L 63/083* (2013.01); *H04W 12/041* (2021.01); *H04W 76/10* (2018.02)

(58) Field of Classification Search
None
See application file for complete search history.

(56) References Cited

U.S. PATENT DOCUMENTS 10,057,813 B1 * 8/2018 Likar .................. H04L 63/0846
10,299,126 B2 * 5/2019 Bryksa ................. H04L 63/083
(Continued)

FOREIGN PATENT DOCUMENTS

CN          104394533          3/2015
CN          104967997          10/2015
(Continued)

OTHER PUBLICATIONS

No stated author; 802.11i Part 11: Wireless Lan Medium Access Control (MAC) and Physical Layer (PHY) specifications; 2004; retrieved from the Internet https://paginas.fe.up.pt/~jaime/0506/SSR/802.11i-2004.pdf; pp. 1-190, as printed. (Year: 2004).*
(Continued)

*Primary Examiner* — Michael W Chao

(57) ABSTRACT

Provided are a router, a network connection method and a mobile terminal. The network connection method comprises: a router receiving a first dynamic password from a server; the router receiving a second dynamic password from a mobile terminal, and performing matching on the basis of the second dynamic password and the first dynamic password; if the matching is successful, establishing a connection, and sending a first result signal to the mobile terminal; and the router purging connection information associated with the connection after the connection has been established. The invention can prevent an unauthenticated terminal from connecting to a router, thereby enhancing the security of a connection established by means of a router.

4 Claims, 8 Drawing Sheets

(51) Int. Cl.
*H04L 9/40* (2022.01)
*H04W 12/041* (2021.01)
*H04W 76/10* (2018.01)

(56) References Cited

U.S. PATENT DOCUMENTS

| | | | |
|---|---|---|---|
| 10,341,939 B2 | 7/2019 | Peng et al. | |
| 10,516,570 B1* | 12/2019 | Lu | H04L 41/0853 |
| 11,368,994 B1* | 6/2022 | Robinson | H04W 12/08 |
| 11,405,789 B1* | 8/2022 | Wei | H04W 60/00 |
| 12,101,225 B2* | 9/2024 | Panje | H04W 48/16 |
| 12,124,748 B2* | 10/2024 | Tsuji | H04W 12/0431 |
| 12,177,207 B2* | 12/2024 | Coggin | G06F 21/45 |
| 12,250,539 B2* | 3/2025 | Nam | H04B 17/318 |
| 2007/0264973 A1* | 11/2007 | Dowek | H04L 63/20 |
| | | | 455/411 |
| 2009/0059874 A1* | 3/2009 | Carter | H04W 12/068 |
| | | | 370/338 |
| 2009/0138643 A1* | 5/2009 | Charles | G06F 9/4401 |
| | | | 709/227 |
| 2010/0115278 A1* | 5/2010 | Shen | H04L 63/061 |
| | | | 713/171 |
| 2010/0246818 A1* | 9/2010 | Yao | H04W 12/0433 |
| | | | 380/270 |
| 2011/0055928 A1* | 3/2011 | Brindza | H04W 12/08 |
| | | | 726/26 |
| 2012/0072976 A1* | 3/2012 | Patil | H04W 12/069 |
| | | | 726/5 |
| 2012/0284785 A1* | 11/2012 | Salkintzis | H04W 12/068 |
| | | | 726/7 |
| 2013/0347073 A1* | 12/2013 | Bryksa | H04L 63/083 |
| | | | 726/4 |
| 2014/0068261 A1* | 3/2014 | Malek | H04W 12/068 |
| | | | 713/168 |
| 2014/0355592 A1* | 12/2014 | Camps | H04W 4/023 |
| | | | 370/338 |
| 2015/0026774 A1* | 1/2015 | Yang | H04L 63/0846 |
| | | | 726/4 |
| 2015/0143473 A1* | 5/2015 | Jung | H04L 63/18 |
| | | | 726/4 |
| 2015/0229475 A1 | 8/2015 | Benoit et al. | |
| 2015/0296554 A1* | 10/2015 | Okazaki | H04W 12/50 |
| | | | 455/418 |
| 2016/0087967 A1* | 3/2016 | Pang | H04W 76/11 |
| | | | 726/6 |
| 2016/0219050 A1* | 7/2016 | Zou | H04W 12/04 |
| 2017/0034215 A1* | 2/2017 | Sigel | H04W 12/08 |
| 2017/0048696 A1* | 2/2017 | Kurihara | H04W 48/20 |
| 2017/0054711 A1* | 2/2017 | Shen | G06Q 30/0204 |
| 2017/0230905 A1* | 8/2017 | Pularikkal | H04W 48/14 |
| 2017/0242874 A1 | 8/2017 | Finnegan | |
| 2017/0366971 A1* | 12/2017 | Iyer | H04W 12/068 |
| 2018/0035291 A1* | 2/2018 | Dowlatkhah | H04W 12/50 |
| 2018/0199205 A1* | 7/2018 | Zhu | H04L 9/083 |
| 2018/0332471 A1* | 11/2018 | Zhu | H04L 63/061 |
| 2020/0067943 A1* | 2/2020 | Falk | H04L 63/166 |
| 2021/0036929 A1* | 2/2021 | Kesavan | H04L 41/12 |
| 2021/0243603 A1* | 8/2021 | Yin | H04L 9/0861 |
| 2023/0362292 A1* | 11/2023 | Liu | H04L 12/2825 |
| 2024/0048985 A1* | 2/2024 | Sanciangco | H04W 12/08 |
| 2024/0276214 A1* | 8/2024 | Nix | H04W 12/069 |
| 2025/0036334 A1* | 1/2025 | Tsuji | H04L 9/30 |

FOREIGN PATENT DOCUMENTS

| | | |
|---|---|---|
| CN | 106375999 | 2/2017 |
| CN | 106412897 | 2/2017 |
| CN | 107864475 | 3/2018 |
| CN | 108111522 | 6/2018 |
| CN | 108990062 | 12/2018 |
| CN | 110213760 | 9/2019 |
| WO | WO 2015/089324 | 6/2015 |
| WO | WO 2017/054483 | 4/2017 |

OTHER PUBLICATIONS

McMuffin, Swaglord; "Strange device in routers client list:"; 2014; retrieved from the internet https://security.stackexchange.com/questions/76141/strange-device-in-routers-client-list; pp. 1-4, as printed. (Year: 2014).*

International Search Report and the Written Opinon Dated Mar. 12, 2020 From the International Searching Authority Re. Application No. PCT/CN2019/125051 and Its Translation of Search Report Into English. (11 Pages).

Notification of Office Action Dated Feb. 1, 2021 From the State Intellectual Property Office of the People's Republic of China Re. Application No. 201910355810.1 and Its Translation Into English. (12 Pages).

Zheng et al., "Mutual Authentication Key Agreement Scheme Based on WAP", Computer Engineering, 36(4): 112-114, Feb. 20, 2010.

Supplementary European Search Report and the European Search Opinion Dated Jan. 4, 2023 From the European Patent Office Re. Application No. 19927153.7. (8 Pages).

* cited by examiner

ROUTER, NETWORK CONNECTION METHOD AND MOBILE TERMINAL

RELATED APPLICATIONS

This application is a National Phase of PCT Patent Application No. PCT/CN2019/125051 having International filing date of Dec. 13, 2019, which claims the benefit of priority of Chinese Patent Application No. 201910355810.1 filed on Apr. 29, 2019. The contents of the above applications are all incorporated by reference as if fully set forth herein in their entirety.

FIELD AND BACKGROUND OF THE INVENTION

The application relates to the field of intelligent communication technology, in particular, to a router, a network connection method, and a mobile terminal.

Inventors of the present application have found through long-term research and development that most current public WiFi connections are directly connected to a router using an unencrypted connection method. After browsing a login page or advertisement page provided by the router, the router allows a connecting terminal device to access the Internet. Since a preset key and a pairwise master key (PMK) of the router are fixed values, a large number of connection sessions remain active in the router for terminal devices in idle or without authorization from a login page on the router, resulting in slow router operation and poor Internet experience.

The main technical problem to be solved by the application is to provide a router, a mobile terminal, and a corresponding network connection method, so as to prevent resource consumption caused by excessive connection sessions of idle or unauthorized terminal devices.

SUMMARY OF THE INVENTION

A detailed description is given in the following embodiments with reference to the accompanying drawings.

To solve the above technical problem, a technical solution adopted in the application is to provide a network connection method applicable to a router, comprising the following steps.

The router receives a first dynamic password from a server.

The router receives a second dynamic password from a mobile terminal and compares the second dynamic password with the first dynamic password.

When the comparison is matched, a connection is established, and a first result signal is sent to the mobile terminal.

The router clears connection information generated by the connection after the connection is established.

To solve the above technical problem, another technical solution adopted in the application is to provide a network connection method applicable to a mobile terminal, comprising the following steps.

The mobile terminal recognizes the image information from the router, and sends a first request signal to the server when the image information recognition is successful.

The mobile terminal receives a second dynamic password from the server.

The mobile terminal sends the second dynamic password to the router for verification.

The mobile terminal receives a first result signal from the router.

To solve the above technical problem, another technical solution adopted in the present application is to provide a mobile terminal, the mobile terminal comprises a memory and a processor interconnected with each other.

The memory stores program data loadable and executable by the processor to carry out the following steps.

The mobile terminal recognizes the image information from the router and sends a first request signal to the server when the image information recognition is successful, wherein the image information comprises an identification code.

The mobile terminal receives a dynamic password from the server.

The mobile terminal sends a dynamic password to the router.

The mobile terminal receives a first result signal from the router.

To solve the above technical problem, another technical solution adopted in the present application is to provide a router, the router comprises a memory and a processor interconnected with each other.

The memory stores program data loadable and executable by the processor to carry out the following steps.

The router receives a first dynamic password from the server.

The router receives a second dynamic password from the mobile terminal and compares the second dynamic password with the first dynamic password, wherein the second dynamic password is assigned to the mobile terminal by the server.

When the comparison is matched, a connection is established, and a first result signal is sent to the mobile terminal.

The router clears connection information generated by the connection after the connection is established.

To solve the above technical problem, another technical solution adopted in the present application is to provide a storage medium in which program data is stored in the storage medium, and the program data can be executed to implement the network connection method described above.

Beneficial Effect

In the network connection method proposed in the application, the mobile terminal identifies the image information of the router and sends a first request signal to the server, the router receives a first dynamic password from the server, the mobile terminal receives a second dynamic password from the router, the mobile terminal sends the second dynamic password to the router, and the router receives the second dynamic password. The second dynamic password is compared with the first dynamic password. When the comparison is matched, the connection is established and connection information generated by this connection is cleared when the connection is established, to prevent idle terminals from connecting to the router.

DESCRIPTION OF SPECIFIC EMBODIMENTS OF THE INVENTION

The following descriptions may clearly and completely disclose the technical solution in the embodiment of the application in combination with the drawings in the embodiment of the application. Obviously, the described embodiments are only part of the embodiments of the application, not all the embodiments. Based on the embodiments of the application, all other embodiments obtained by ordinary technical personnel in the art without creative endeavor belong to the scope of protection of the application.

The terms "first", "second" and "third" in this application are only used for description purpose, and cannot be understood as indicating or implying relative importance or implicitly indicating the quantity of the indicated technical features. Thus, the features defined as "first", "second" and "third" may explicitly or implicitly include at least one of the features. In the description of the application, "multiple" means at least two, such as two, three, etc., unless otherwise specified. All directional indications in the embodiment of the application (such as up, down, left, right, front, back . . . ) are merely used to explain the relative position relationships, motion situations, and etc. between the components under a certain attitude (as shown in the attached figure). If the specific attitude changes, the directional indication may change accordingly. In addition, the terms "include" and "have" and any variations thereof are intended to cover exclusive inclusions. For example, a process, method, system, product, or device that contains a series of steps or units is not limited to the listed steps or units, but may also include steps or units not listed, or may also include other steps or units inherent to these processes, methods, products, or equipment.

The reference to "Embodiments" herein means that specific features, structures, or features described in connection with the embodiments may be included in at least one embodiment of the present application. The presence of the phrase in various places in the specification does not necessarily refer to the same embodiment, nor is it an independent or alternative embodiment mutually exclusive with other embodiments. It is explicitly and implicitly understood by those skilled in the art that the embodiments described herein may be combined with other embodiments.

The present application is described in detail below in combination with the drawings and the embodiment.

Figure 1:
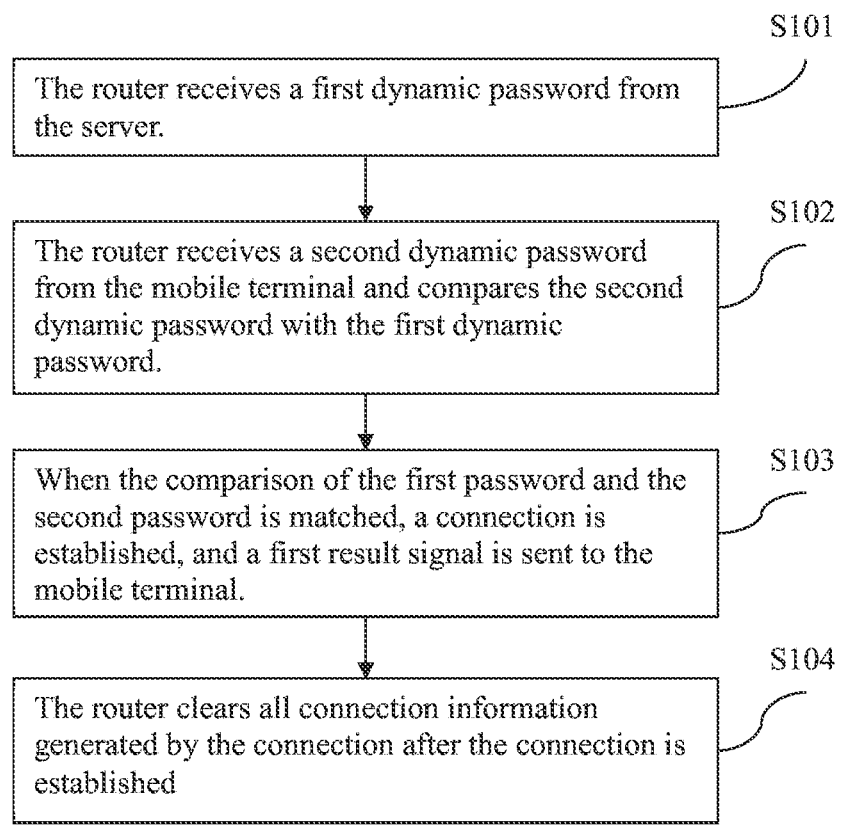
FIG. 1 is a flowchart of a first embodiment of a router network connection method of the present application.

Refer to FIG. 1, a flowchart of a first embodiment of a router network connection method of the present application is described in the following steps.

In step S101, the router receives a first dynamic password from the server.

Wherein, the first dynamic password is a password randomly assigned by the server, which can be a digital password, a combination of numbers and letters, such as "128963", "ad5263", etc.

In step S102, the router receives a second dynamic password from the mobile terminal and compares the second dynamic password with the first dynamic password.

The second dynamic password, in one embodiment, is the same as the first dynamic password, randomly assigned by the server. After the server receives the first request signal from the mobile terminal, the server may randomly generate a dynamic password which is then simultaneously sent to the mobile terminal and the router, respectively, so that the mobile terminal can conduct an identity verification with the router through the dynamic password. In this case, the mobile terminal sends the second dynamic password to the router for verification.

In step S103, when the comparison of the first password and the second password is matched, a connection is established, and a first result signal is sent to the mobile terminal.

After receiving the second dynamic password sent by the mobile terminal, the router compares the second dynamic password with the first dynamic password received from the server. If the results are inconsistent, the verification is failed so that the connection cannot be established. If the results are consistent, the verification is successful, allowing a connection to be established for the mobile terminal. A first result signal is therefore sent to the mobile terminal to prompt the mobile terminal that the network connection is established.

In step S104, the router clears all connection information generated by the connection after the connection is established.

After the connection is successful, the router may clear the dynamic password and information of the mobile terminal connected, such as the model and identification code of the mobile terminal, so that the mobile terminal cannot automatically establish a new connection when it enters the WiFi area next time.

Figure 4:
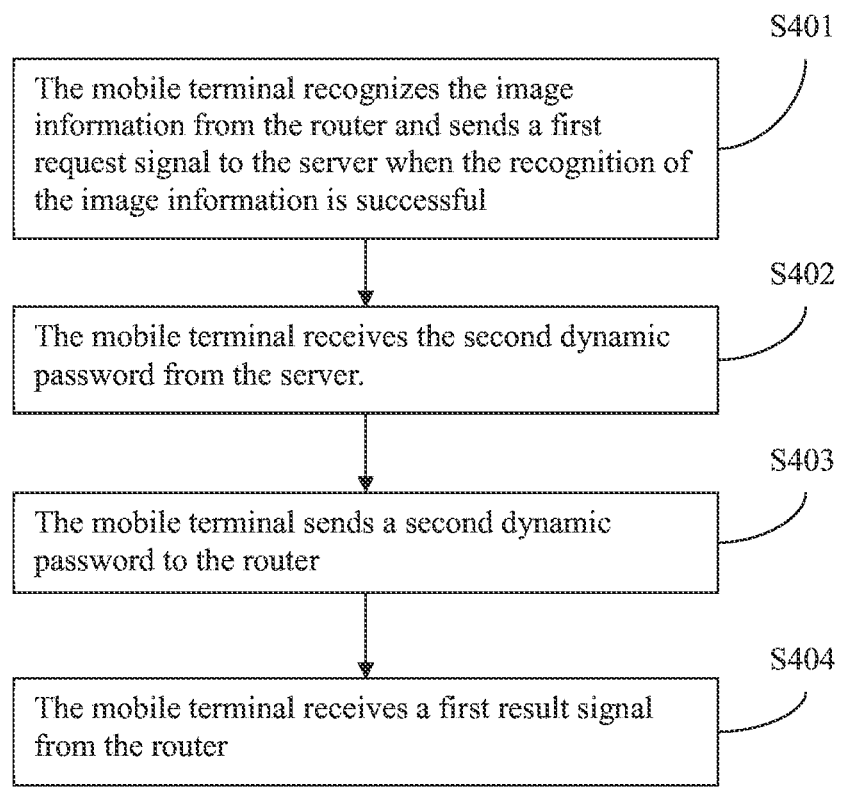
FIG. 4 is a flowchart of a first embodiment of a mobile terminal network connection method of the present application.

Refer to FIG. 4, a flowchart of a first embodiment of a mobile terminal network connection method of the present application comprises the following steps.

In step S401: the mobile terminal recognizes the image information from the router and sends a first request signal to the server when the recognition of the image information is successful.

Wherein, the mobile terminal is a mobile phone, an iPad, and other electronic devices. The image information of the router can be an identification code information such as a two-dimensional code or a bar code, which identifies the address and factory information of the router. The mobile terminal can scan the image through a camera and other devices, and send a first request to the server after obtaining the information of the router from the scanning.

In step S402, the mobile terminal receives the second dynamic password from the server.

Wherein, the second dynamic password, in one embodiment, is the same as the first dynamic password in step S101, randomly assigned by the server. It can be a digital password, a combination of numbers and letters, such as "128963", "ad5263", etc.

In step S403, the mobile terminal sends a second dynamic password to the router.

After receiving the second dynamic password sent by the server, the mobile terminal sends the second dynamic password to the router, which is then verified by the router.

In step S404, the mobile terminal receives a first result signal from the router.

The router compares the second dynamic password with the first dynamic password upon reception of the second dynamic password from the mobile terminal. A connection is established when the first dynamic password and the second dynamic password are matched. A first result is sent to the mobile terminal so that when the mobile terminal receives the first result, the mobile terminal confirms that the connection is established.

The scheme proposed in this embodiment is summarized as follows. The mobile terminal recognizes the image information of the router, sends the first request signal to the server, then receives the second dynamic password from the server. The router receives the first dynamic password from the server, the mobile terminal sends the second dynamic password to the router, and the router compares the second dynamic password with the first dynamic password. When the comparison is matched, the connection is established. When the connection is established, all connection information generated by the connection is cleared, so as to prevent the performance hits caused by automatic establishment of unwanted new connections when the mobile terminal enters the WiFi area next time.

Figure 2:
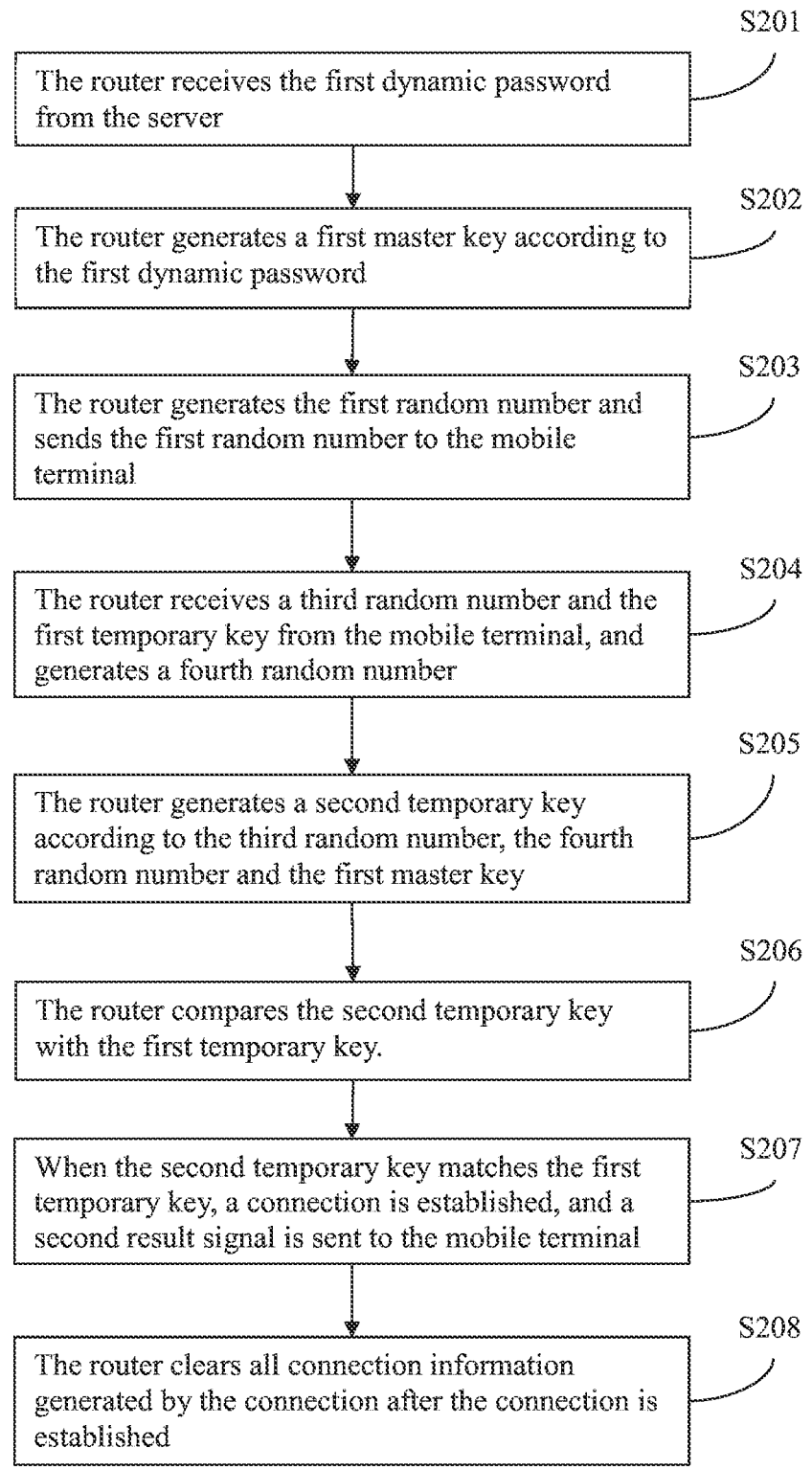
FIG. 2 is a flowchart of a second embodiment of the router network connection method of the present application.

See FIG. 2, a flowchart of a second embodiment of the router network connection method of the application comprises the following steps.

In step S201: the router receives the first dynamic password from the server.

As in the previous embodiment, the first dynamic password is a password randomly assigned by the server, which can be a digital password, a combination of numbers and letters, such as "128963", "ad5263", etc.

In step S202: the router generates a first master key according to the first dynamic password.

The method of generating the first master key by the router according to the first dynamic password is based on a well-known hash function PBKDF2_SHA_1, shown as:

PMK=PBKDF2_SHA1 (first dynamic password, SSID, SSID length, 4096)

where PMK denotes a master key, SSID denotes a router address, and PBKDF2_SHA1 denotes a hash operation.

Wherein, the pairwise master key (PMK) is a symmetric key that the applicant (i.e., the mobile terminal) and the authenticator (i.e., the router) can share a symmetric key called a pair of master keys, which is used to control the signal access between the two. According to the embodiment of the application, the PMK comes from the passwords, and in other embodiments, the PMK can be dynamically specified.

In step S203, the router generates the first random number and sends the first random number to the mobile terminal.

The first random number is generated by the router, and the router sends the first random number to the mobile terminal after generating the first random number. The mobile terminal is capable of generating a second random number, which may be sent to the router as a third random number.

In step S204, the router receives a third random number and the first temporary key from the mobile terminal, and generates a fourth random number.

Wherein, the fourth random number, like the third random number, is a randomly generated number. The fourth random number is different from the third random number and can only be used once.

In step S205, the router generates a second temporary key according to the third random number, the fourth random number, and the first master key.

The second temporary key is generated according to the third random number, the fourth random number, and the first master key in a pseudo-random function PRF-X, shown as:

PTK=PRF-X (PMK, "pairwise key expansion"), Min (AA, SA)||Max(AA, SA)||Min(ANonce, SNonce)||Max (ANonce, SNonce))

Wherein, PTK denotes the temporary key, ANonce denotes a random number generated by the router, SNonce denotes a random number generated by the mobile terminal, AA denotes an identification address of the router, SA denotes an identification address of the mobile terminal, PRF-X denotes the pseudo-random function, and the pairwise key expansion is a constant string.

It should be noted that when the mobile terminal sends the third random number to the router, it includes the Media Access Control or Medium Access Control (MAC) address of the mobile terminal, which is translated into media access control or physical address, hardware address, for defining the location of network equipment. In the Open System Interconnection/Open System Interconnection Reference Model (OSI/RM), the third network layer is responsible for the IP address and the second layer data link is responsible for the MAC address. Therefore, a host has a MAC address, and each network location has an IP address dedicated to it. The MAC address is determined by the network card and is fixed. The MAC address is the aforementioned identification address.

In step S206, the router compares the second temporary key with the first temporary key.

After calculating the second temporary key, the router compares the calculated second temporary key with the first temporary key received from the mobile terminal.

In step S207, when the second temporary key matches the first temporary key, a connection is established, and a second result signal is sent to the mobile terminal.

Wherein, the router compares the second temporary key with the first temporary key. If the results are inconsistent, the verification is failed, and the connection cannot be established. If the results are consistent, the verification is successful, and connection requests from the mobile terminal are allowed, so that the connection is established. A second result signal is sent to the mobile terminal to prompt the mobile terminal about establishment of a network connection.

In step S208, the router clears all connection information generated by the connection after the connection is established.

After the connection is successful, the router may clear the dynamic password of the connection and information related to the connected mobile terminal. The master keys, temporary keys, device identification addresses, and random numbers of the mobile terminal generated by such connection are cleared so that the mobile terminal cannot automatically establish a new connection when it enters the WiFi area next time.

Figure 5:
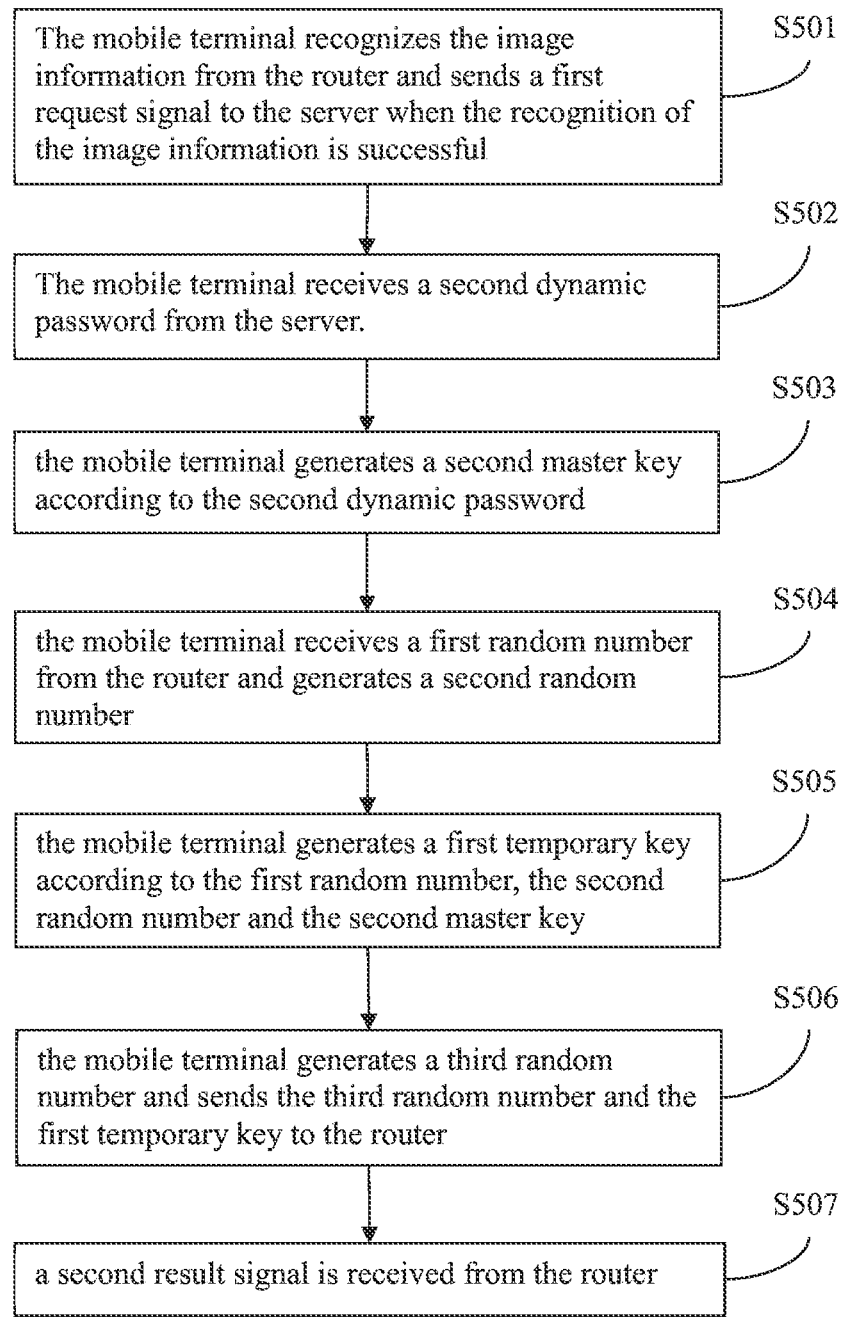
FIG. 5 is a flowchart of a second embodiment of the mobile terminal network connection method of the present application.

See FIG. 5, which is a flowchart of a second embodiment of the mobile terminal network connection method of the present application. The steps S501 and S502 are respectively the same as S401 and S402 in FIG. 4, and will not be explained here.

In step S503, the mobile terminal generates a second master key according to the second dynamic password.

The mobile terminal sends a first request signal to the server after recognizing the image information of the router, and the server sends a second dynamic password to the mobile terminal upon receiving the first request signal. The mobile terminal generates a second master key by substituting the second dynamic password into a hash function of:

PMK=PBKDF2_SHA1 (dynamic password, SSID, SSID length, 4096)

Where PMK denotes a master key, SSID denotes a router address, and PBKDF2_SHA1 is a hash function.

Wherein, PMK is a symmetric key that the applicant (i.e., the mobile terminal) and the authenticator (i.e., the router) can share a symmetric key called a pair of master keys, which is used to control the signal access between the two. According to the embodiment of the application, the PMK comes from the password, and in other embodiments, the PMK can be dynamically specified.

In step S504: the mobile terminal receives a first random number from the router and generates a second random number.

The first random number and the second random number, in one embodiment, are respectively identical to the fourth random number and the third random number.

Specifically, the first random number and the fourth random number are random numbers generated by the router, the second random number and the third random number are random numbers generated by the mobile terminal, and all the random numbers can only be used once in the process for calculating and generating the temporary keys.

In step S505, the mobile terminal generates a first temporary key according to the first random number, the second random number, and the second master key.

The first temporary key is generated according to the first random number, the second random number, and the second master key in a pseudo-random function as below:

PTK=PRF-X (PMK, "pairwise key expansion"), Min (AA, SA)||Max(AA, SA)||Min(ANonce, SNonce)||Max (ANonce, SNonce))

Wherein, PTK denotes the temporary key, ANonce denotes the random number generated by the router, SNonce denotes the random number generated by the mobile terminal, AA denotes the identification address of the router, SA denotes the identification address of the mobile terminal, PRF-X denotes a pseudo-random function, and pairwise key expansion is a constant string.

It should be noted that when the router sends the first random number to the router, it includes the Media Access Control or Medium Access Control (MAC) address of the mobile terminal, which is translated into media access control or physical address, hardware address, for defining the location of network equipment. In the Open System Interconnection/Open System Interconnection Reference Model (OSI/RM), the third network layer is responsible for the IP address and the second layer data link is responsible for the MAC address. Therefore, a host has a MAC address, and each network location has an IP address dedicated to it. The MAC address is determined by the network card and is fixed. The MAC address is the aforementioned identification address.

In step S506, the mobile terminal generates a third random number and sends the third random number and the first temporary key to the router.

After calculating the first temporary key, the mobile terminal generates a third random number and sends the third random number to the router, which contains the MAC address of the mobile terminal, that is, the identification address.

In step S507, a second result signal is received from the router.

After receiving the third random number, the router calculates the second temporary key, compares the second temporary key with the first temporary key, establishes a connection after the comparison is matched, and sends the second result signal to the mobile terminal, and the mobile terminal confirms that the connection is established when the second signal is received.

The scheme proposed in this embodiment is summarized as follows. The mobile terminal recognizes the image information of the router, sends the first request signal to the server, receives the second dynamic password from the server, and generates the second master key according to the second dynamic password. The router receives the first dynamic password from the server and generates the first master key according to the first dynamic password, so that the router generates the first random number and sends it to the mobile terminal. The mobile terminal generates a second random number after receiving the first random number, and generates a first temporary key according to the first random number, the second random number, and the second master key. The mobile terminal generates a third random number and sends the third random number and the first temporary key to the router, and the router generates the fourth random number after receiving the third random number. The second temporary key is generated according to the third random number, the fourth random number, and the first master key. After the second temporary key is generated, the second temporary key is matched with the first temporary key. After the comparison is matched, the connection is established, and all connection information generated by this connection is cleared after the connection is established, so that the mobile terminal cannot automatically establish a new connection when it enters the WiFi area next time.

Figure 3:
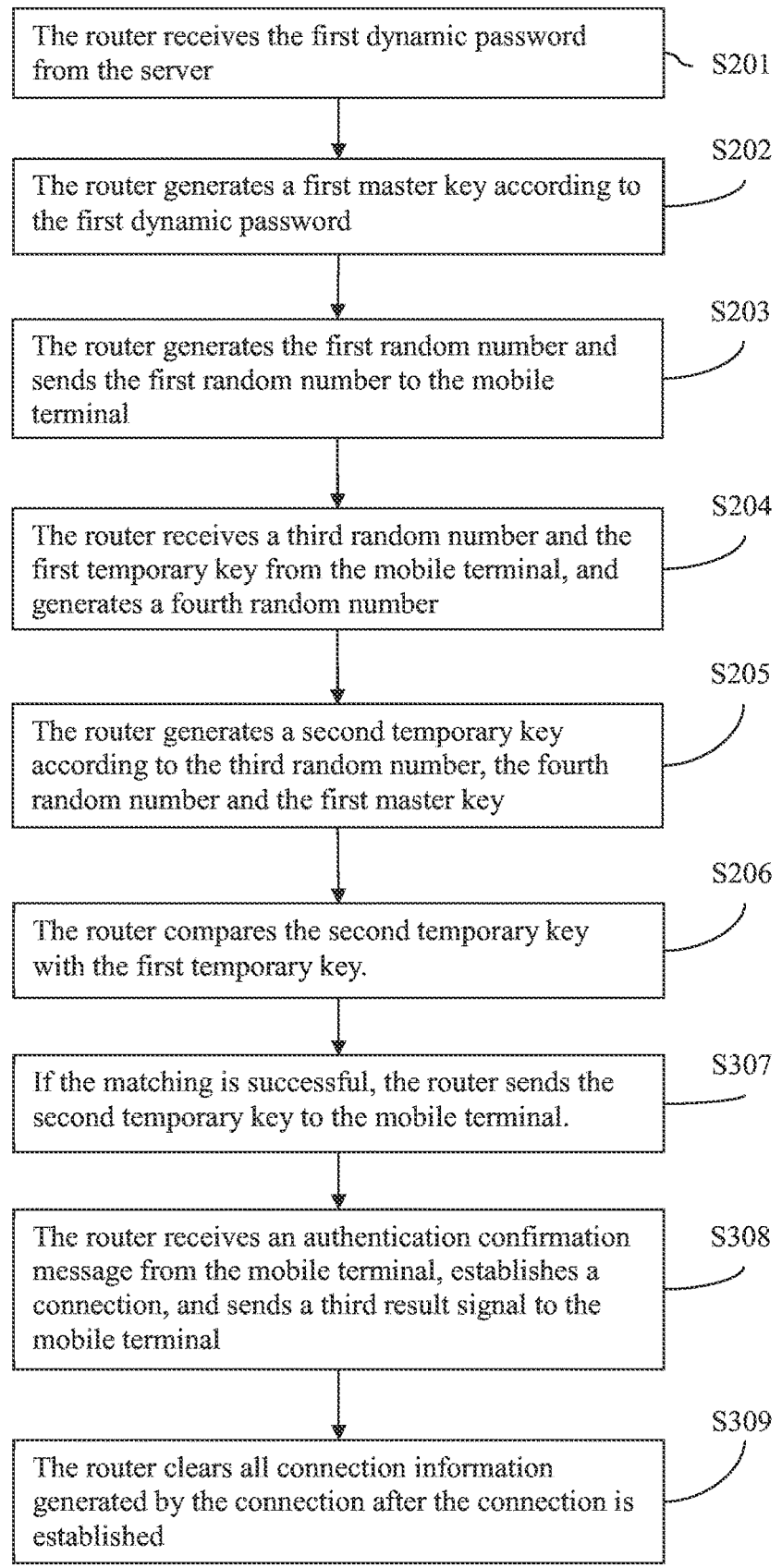
FIG. 3 is a flowchart of a third embodiment of the router network connection method of the present application.

See FIG. 3 for a flowchart of a third embodiment of the router network connection method of the present application. Compared with the second embodiment shown in FIG. 2, the differences are found after comparing the second temporary key with the first temporary key in step S206. The steps are shown below.

In step S307, if the comparison is matched, the router sends the second temporary key to the mobile terminal.

After the router successfully compares the first temporary key and the second temporary key, the second temporary key is sent to the mobile terminal.

In step S308, the router receives an authentication confirmation message from the mobile terminal, establishes a connection, and sends a third result signal to the mobile terminal.

After the mobile terminal receives the second temporary key, it compares the second temporary key with the first temporary key again. If the comparison is not matched, the connection is failed. If the comparison is matched, the authentication confirmation message is sent to the router. After receiving the confirmation message, the router establishes the connection and sends a third result signal to the mobile terminal to prompt the mobile terminal to about the connection results.

In step S309: the router clears all connection information generated by the connection after the connection is established.

After the connection is successful, the router may clear the dynamic password of the connection and all information relevant to the connected mobile terminal. All the master keys, temporary keys, device identification addresses, and random numbers of the mobile terminal generated by such connection are cleared, so that the mobile terminal cannot automatically establish a new connection when the mobile terminal enters the WiFi area next time.

Figure 6:
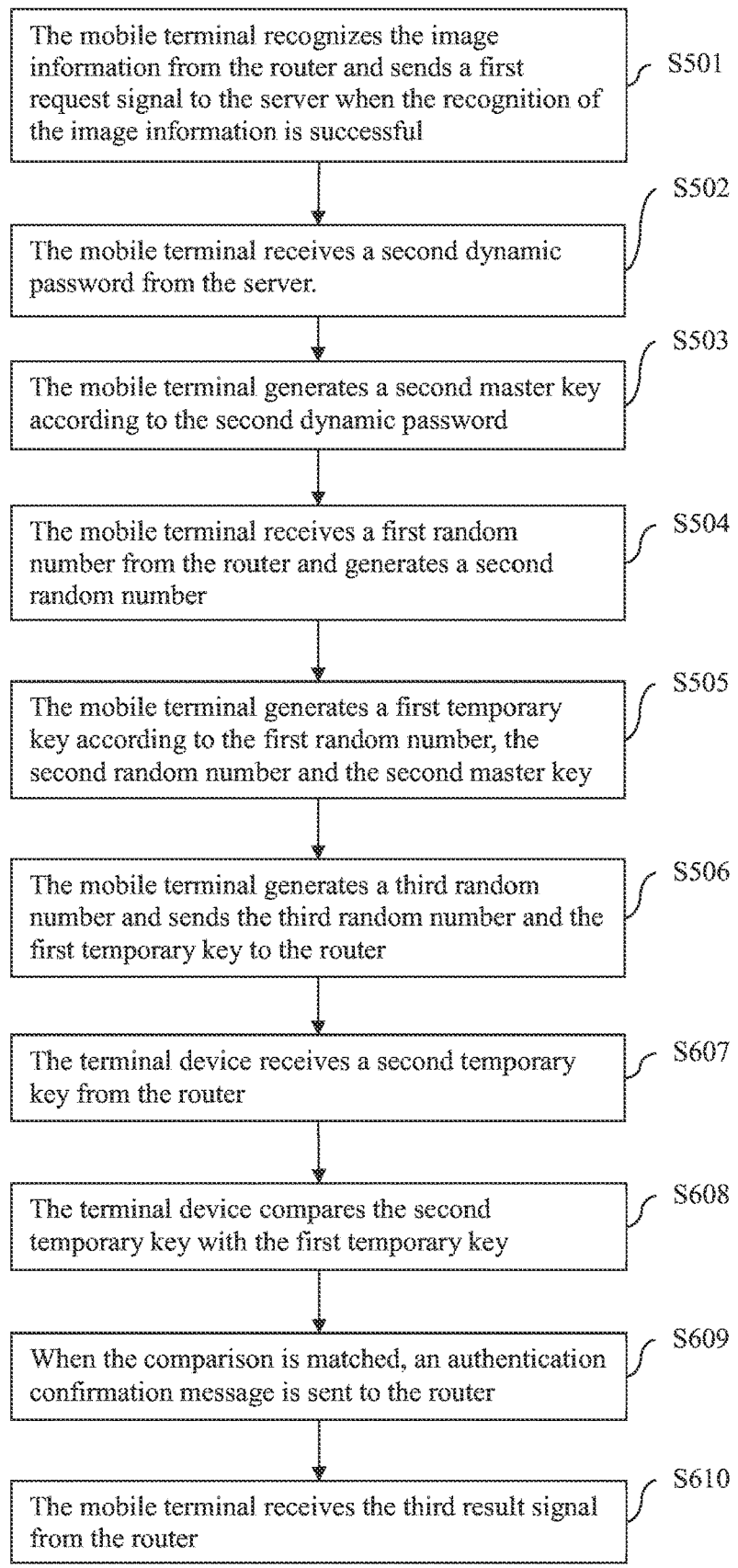
FIG. 6 is a flowchart of a third embodiment of the mobile terminal network connection method of the present application.

See FIG. 6 for the flowchart of a third embodiment of the mobile terminal network connection method of the present application. Compared with the second embodiment shown in FIG. 5, the difference is shown after generating a third random number and sending the third random number and the first temporary key to the router in step S506, as below.

In step S607, the terminal device receives a second temporary key from the router.

The router sends the second temporary key to the mobile terminal after successfully comparing the second temporary key with the first temporary key.

In step S608, the terminal device compares the second temporary key with the first temporary key.

After receiving the second temporary key from the router, the mobile terminal compares the second temporary key with the first temporary key. When the comparison is not matched, the connection is failed.

In step S609, when the comparison is matched, an authentication confirmation message is sent to the router.

The mobile terminal compares the second temporary key with the first temporary key, and sends an authentication confirmation message to the router to prompt the router that the authentication is confirmed.

In step S610: the mobile terminal receives the third result signal from the router.

The router establishes a connection after receiving the authentication confirmation message sent by the mobile terminal, and sends a third result signal to the mobile terminal to prompt that the mobile terminal is connected successfully.

Compared with the second embodiment (FIGS. 2 and 5), the differences are as summarized. The router compares the second temporary key, and after the comparison is matched, the router sends the second temporary key to the mobile terminal, and the mobile terminal then compares the second temporary key with the first temporary key once, and after the comparison is successful, an authentication confirmation message is sent to the router, the router allows the mobile terminal to connect after receiving the authentication confirmation message, and sends the first connection after the connection is established. The third result signal is sent to the mobile terminal to prompt the mobile terminal that the connection is established. In this embodiment, two comparisons are performed to further improve the security of the network connection. The router clears all connection information generated by the connection after the connection is established, so that the mobile terminal cannot automatically establish a new connection when the mobile terminal enters the WiFi area next time.

Figure 7:
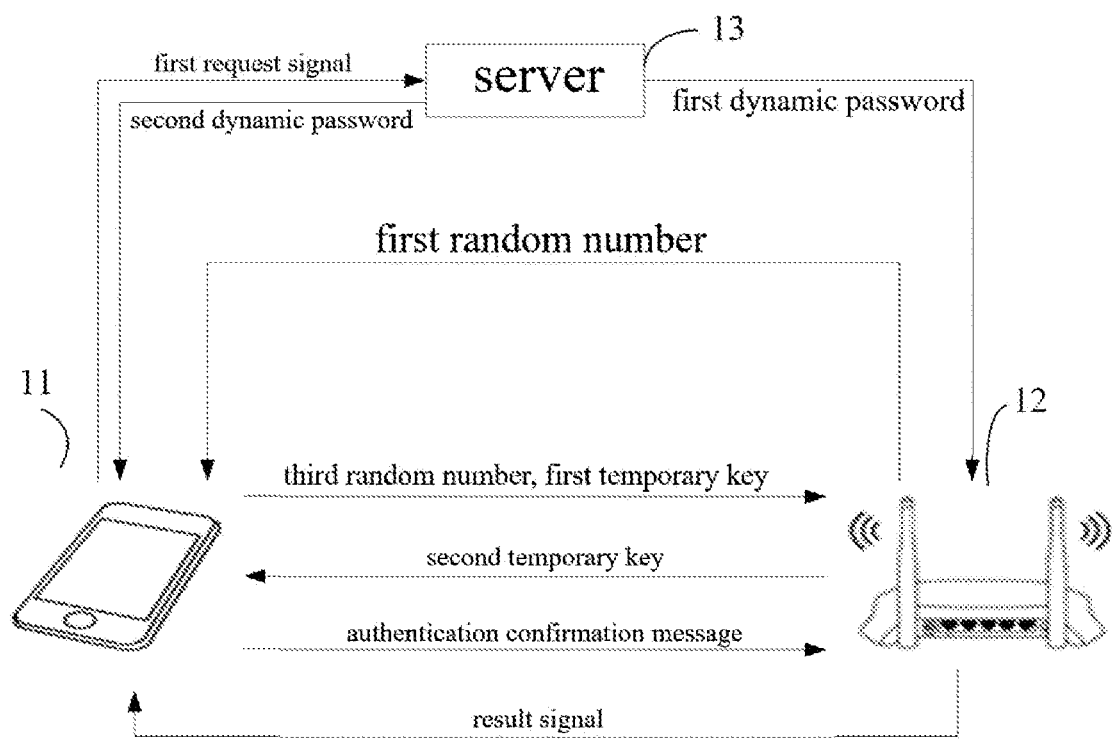
FIG. 7 is a structural diagram of signal transmission of the network connection method of the mobile terminal and the router of the present application.

Please refer to FIG. 7 for a structural diagram of signal transmission of mobile terminal and router in the present application. Specifically, the mobile terminal 11 recognizes the image information of the router 12 and sends a first request signal to the server 13. After receiving the first request signal, the server 13 sends a first dynamic password to the router 12 and a second dynamic password to the mobile terminal 11. The mobile terminal 11 generates a second master key according to the second dynamic password, and the router 12 generates a first random number and sends the first random number to the mobile terminal 11. The mobile terminal 11 generates a second random number, and generates a first temporary key according to the first random number, the second random number, and the second master key. The first temporary key is then sent to the router 12 for verification. The router 12 receives a third random number and the first temporary key from the mobile terminal, generates a fourth random number, and then generates a second temporary key according to the third random number, the fourth random number, and the first master key. The router 12 then compares the second temporary key with the first temporary key. If the comparison is matched, the router 12 sends the second temporary key to the mobile terminal 11, and the mobile terminal 11 sends an authentication confirmation message to the router 12 after verifying the second temporary key with the first temporary key. The router 12 establishes a connection after receiving the authentication confirmation message, and sends a result signal to the mobile terminal 11 prompting the successful connection establishment.

Figure 8:
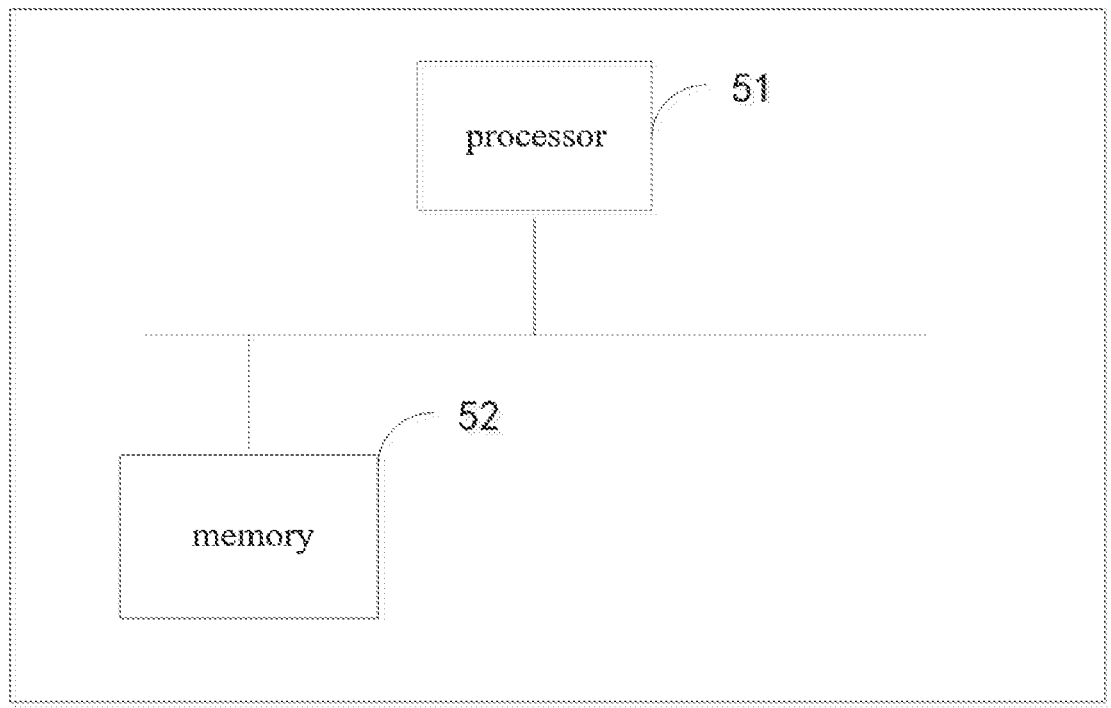
FIG. 8 is a structural diagram of the mobile terminal/router of the present application.

Please refer to FIG. 8, which is a structural diagram of the mobile terminal or router of the present application. The mobile terminal or router comprises a processor 51 and a memory 52 coupled to the processor 51.

The memory 52 stores program data executable by the processor 51 to carry out the connection method as described in any of the aforementioned embodiments.

The processor 51 is configured to load and execute the program data stored in the memory 52.

Wherein, processor 51 is also referred to as the central processing unit (CPU). The processor 51 may be an integrated circuit chip with signal processing capability. The processor 51 may also be a general-purpose processor, a digital signal processor (DSP), an ASIC, a ready-made programmable gate array (FPGA), or other programmable logic devices, discrete gate, or transistor logic devices, and discrete hardware components. The general processor can be a microprocessor or the processor can be any conventional processor, etc.

The memory 52 can be a memory module, a TF card, etc., which can store all the information in the mobile terminal, comprising the input original data, computer programs, intermediate operation results, and final operation results. It stores and takes out information according to the position designated by the controller. With the memory, the mobile terminal has the memory function and can ensure normal operations. The memory of mobile terminal can be divided into main memory and auxiliary memory (external memory) according to the purpose memory, and also can be classified into external memory and internal memory. The external storage is usually magnetic medium or optical disk, which can store information for a long time. The memory refers to the storage unit on the motherboard, which is used to store the currently executing data and programs. However, it is only used for temporary storage of programs and data. If the power is turned off or power outage occurs, the data may be lost.

The mobile terminal or router also comprises other devices, which are the same as other devices and functions in the mobile terminal or router in the prior art, and will not be repeated here.

Figure 9:
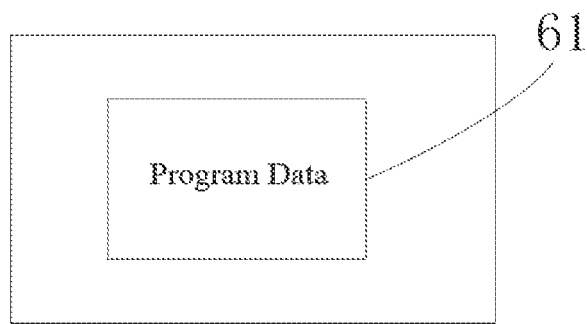
FIG. 9 is a structural diagram of an embodiment of a storage medium of the present application.

Refer to FIG. 9, a structural diagram of an embodiment of a storage medium of the present application is shown. The storage medium of the present application stores program data 61 executable by the processor to carry out the connection methods as described in the aforementioned embodiments. The program data 61 can be stored in the storage medium in the form of software products, comprising a number of instructions to enable a computer device (which may be a personal computer, a server, or a network device, etc.) or a processor to execute all or part of the steps of the methods described in the various embodiments of the present application. The storage devices mentioned above may include: U disk, mobile hard disk, read-only memory (ROM), random access memory (RAM), disk or CD, and other media that can store program code, or terminal equipment such as computer, server, mobile phone, tablet, etc.

In the several embodiments provided by this application, it should be understood that the disclosed system, device, and method can be realized in alternative ways. For example, the embodiments of the device described above is only schematic. For example, the definitions of modules or units are merely based on logical functions. In actual implementation, there may be other ways to define the units, for example, multiple units or components can be combined or integrated into another system, or some features can be ignored or not implemented. On the other hand, the mutual coupling or direct coupling or communication connection shown or discussed may be indirect coupling or communication connection through some interfaces, devices, or units, and may be in the form of electrical, mechanical, or other forms.

In addition, each functional unit in each embodiment of the present application can be integrated into a processing unit, or each unit may exist independently, or two or more units may be integrated in one unit. The integrated unit can be implemented in the form of hardware or software function unit.

The above embodiments are merely illustrative implementations of the application, and are not intended to limit the scope of the patent of the application. All equivalent structure or equivalent process transformation made by using the description and drawings of the application, or directly or indirectly applicable to other related technical fields, are similarly included in the scope of patent protection of the application.

What is claimed is:

1. A network connection method applicable to a router, wherein the method comprises following steps:
    the router receiving a first dynamic password from a server;
    the router receiving a second dynamic password from a mobile terminal and comparing the second dynamic password with the first dynamic password;
    when the comparison is matched, establishing a connection, and sending a first result signal to the mobile terminal; and
    the router clearing connection information generated by the connection after the connection is established;
    wherein the second dynamic password is same as the first dynamic password, and the connection information generated by the connection comprises a model and an identification code of the mobile terminal;
    wherein after receiving the first dynamic password from the server, the router performs following steps:
    generating a first master key according to the first dynamic password;
    generating a first random number and sending the first random number to the mobile terminal, wherein the mobile terminal is capable of generating a second random number;
    receiving a third random number and a first temporary key from the mobile terminal and generating a fourth random number;
    generating a second temporary key according to the third random number, the fourth random number, and the first master key;
    comparing the second temporary key with the first temporary key; and
    when the comparison is matched, establishing the connection, and sending a second result signal to the mobile terminal;
    wherein the first random number and the second random number are respectively identical to the fourth random number and the third random number, the first random number and the fourth random number are random numbers generated by the router, the second random number and the third random number are random numbers generated by the mobile terminal, and all the random numbers are only used once in a process for calculating and generating the first temporary key and the second temporary key;
    wherein the second dynamic password is the same as the first dynamic password, both randomly assigned by the server, and used to identity verification between the router and the mobile terminal; the second temporary key is generated by applying a pseudo-random function to the first master key, identification addresses of the router and the mobile terminal, and exchanged one-time random numbers from the router and the mobile terminal; the first master key is derived using a hash function based on the first dynamic password and a service set identifier (SSID) of the router; upon receiving a connection request from the mobile terminal, triggered by the mobile terminal recognizing an image identifier associated with the router, the router transmits a first random number to the mobile terminal and receives the third random number and the first temporary key in response; the router then generates the second temporary key based on exchanged random numbers and a previously generated master key; if the second temporary key matches the first temporary key received from the mobile terminal, the router transmits the second temporary key back to the mobile terminal for confirmation; upon receiving an authentication confirmation message from the mobile terminal, the router establishes the connection, thereby completing a dual-handshake process; after the connection is successfully established, the router actively clears all credentials and identification data generated during a session including passwords, the random numbers, addresses, and keys, to prevent the mobile terminal from automatically reconnecting when re-entering a WiFi area.

2. The network connection method according to claim 1, wherein the first dynamic password is a digital password or a combination of numbers and letters.

3. A router, comprising a memory and a processor interconnected with each other, wherein the memory stores program data loadable and executable by the processor to carry out following steps:
    the router receiving a first dynamic password from a server;
    the router receiving a second dynamic password from a mobile terminal and comparing the second dynamic password with the first dynamic password, wherein the second dynamic password is assigned to the mobile terminal by the server;

when the comparison is matched, establishing a connection, and sending a first result signal to the mobile terminal; and the router clearing connection information generated by the connection after the connection is established;

wherein the second dynamic password is same as the first dynamic password, and the connection information generated by the connection comprises a model and an identification code of the mobile terminal;

wherein after receiving the first dynamic password from the server, the router performs following steps:

generating a first master key according to the first dynamic password;

generating a first random number and sending the first random number to the mobile terminal, wherein the mobile terminal is capable of generating a second random number;

receiving a third random number and a first temporary key from the mobile terminal and generating a fourth random number;

generating a second temporary key according to the third random number, the fourth random number, and the first master key;

comparing the second temporary key with the first temporary key; and when the comparison is matched, establishing the connection, and sending a second result signal to the mobile terminal;

wherein the first random number and the second random number are respectively identical to the fourth random number and the third random number, the first random number and the fourth random number are random numbers generated by the router, the second random number and the third random number are random numbers generated by the mobile terminal, and all the random numbers are only used once in a process for calculating and generating the first temporary key and the second temporary key;

wherein the second dynamic password is the same as the first dynamic password, both randomly assigned by the server, and used to identity verification between the router and the mobile terminal; the second temporary key is generated by applying a pseudo-random function to the first master key, identification addresses of the router and the mobile terminal, and exchanged one-time random numbers from the router and the mobile terminal; the first master key is derived using a hash function based on the first dynamic password and a service set identifier (SSID) of the router; upon receiving a connection request from the mobile terminal, triggered by the mobile terminal recognizing an image identifier associated with the router, the router transmits a first random number to the mobile terminal and receives the third random number and the first temporary key in response; the router then generates the second temporary key based on exchanged random numbers and a previously generated master key; if the second temporary key matches the first temporary key received from the mobile terminal, the router transmits the second temporary key back to the mobile terminal for confirmation; upon receiving an authentication confirmation message from the mobile terminal, the router establishes the connection, thereby completing a dual-handshake process; after the connection is successfully established, the router actively clears all credentials and identification data generated during a session including passwords, the random numbers, addresses, and keys, to prevent the mobile terminal from automatically reconnecting when re-entering a WiFi area.

4. The router according to claim 3, wherein the first dynamic password is a digital password or a combination of numbers and letters.

* * * * *